(12) United States Patent
Kikuchi

(10) Patent No.: US 7,780,429 B2
(45) Date of Patent: Aug. 24, 2010

(54) THREE-DIMENSIONAL MOLDING DEVICE

(75) Inventor: Shigeki Kikuchi, Hamamatsu (JP)

(73) Assignee: Roland DG Corporation, Hamamatsu-Shi (JP)

( * ) Notice: Subject to any disclaimer, the term of this patent is extended or adjusted under 35 U.S.C. 154(b) by 91 days.

(21) Appl. No.: 11/934,726

(22) Filed: Nov. 2, 2007

(65) Prior Publication Data

US 2008/0174050 A1 Jul. 24, 2008

(30) Foreign Application Priority Data

Dec. 22, 2006 (JP) ............................. 2006-346425

(51) Int. Cl.
B29C 35/08 (2006.01)
(52) U.S. Cl. .............. 425/174.4; 425/375; 425/89; 264/113; 264/497; 264/401
(58) Field of Classification Search ............. 425/375, 425/174.4, DIG. 47, 89; 264/113, 401, 497, 264/308, 494
See application file for complete search history.

(56) References Cited

U.S. PATENT DOCUMENTS

| | | | | |
|---|---|---|---|---|
| 4,960,674 A | * | 10/1990 | Fudim et al. | 430/284.1 |
| 5,171,490 A | * | 12/1992 | Fudim | 264/401 |
| 5,904,890 A | * | 5/1999 | Lohner et al. | 264/401 |
| 6,027,682 A | * | 2/2000 | Almquist et al. | 264/401 |
| 6,627,376 B1 | * | 9/2003 | Ueno | 430/269 |
| 7,308,215 B2 | * | 12/2007 | Watanabe | 399/67 |
| 2002/0195744 A1 | * | 12/2002 | Otsuki et al. | 264/272.17 |
| 2003/0205849 A1 | * | 11/2003 | Farnworth | 264/401 |
| 2003/0207213 A1 | * | 11/2003 | Farnworth | 430/315 |
| 2004/0159967 A1 | * | 8/2004 | Farnworth | 264/71 |
| 2006/0037406 A1 | * | 2/2006 | Dharia | 73/818 |
| 2007/0003650 A1 | * | 1/2007 | Schroeder | 425/71 |
| 2009/0130449 A1 | * | 5/2009 | El-Siblani | 428/409 |

FOREIGN PATENT DOCUMENTS

| EP | 598498 A1 | * | 5/1994 |
|---|---|---|---|
| JP | 2003039564 A | * | 2/2003 |

* cited by examiner

Primary Examiner—Khanh Nguyen
Assistant Examiner—Keith T Aziz
(74) Attorney, Agent, or Firm—Lee, Hong, Degerman, Kang & Waimey

(57) ABSTRACT

The present invention relates to a three-dimensional molding device for producing a three-dimensional molded object. The three-dimensional molding device comprises a receptacle for retaining a light-curing resin, a light source for irradiating light to cure the light-curing resin retained inside the receptacle, wherein the three-dimensional molded object is produced by curing the light-curing resin, and a flexible three-dimensional molded object holding plate, which adheres to the light-curing resin and holds the three-dimensional molded object when the resin in the receptacle is cured.

19 Claims, 4 Drawing Sheets

THREE-DIMENSIONAL MOLDING DEVICE

CROSS-REFERENCE TO RELATED APPLICATIONS

Pursuant to 35 U.S.C. §119(a), this application claims the benefit of earlier filing date and right of priority to Japanese Application No. 2006-346425, filed on Dec. 22, 2006, the contents of which are hereby incorporated by reference herein in their entirety.

FIELD OF THE INVENTION

The present invention relates to a three-dimensional molding device. Specifically, the present invention relates to a three-dimensional molding device for producing a three-dimensional molded object by curing a light-curing resin via light irradiation.

BACKGROUND OF THE INVENTION

In the related art, three-dimensional molding devices have been known. Specifically, a light-curing resin of the three-dimensional molding device, which is cured by irradiation using visible light, ultraviolet light, or the like, has been known.

For example, these kinds of three-dimensional molding devices are disclosed in Japanese Laid-Open Patent Application (Kokai) Publication Number 2002-370286 (JP 2002-370286) and Japanese Laid-Open Patent Application (Kokai) Publication Number 2003-039564 (JP 2003-039564).

JP 2002-370286 discloses a device in which a transparent elastic separating layer is disposed on a glass surface, a light-curable resin is placed on the transparent elastic separating layer disposed on the glass surface, light is irradiated from below the glass surface, the light curable resin is cured, and three-dimensional molding is carried out. In this device, because a membrane of a highly elastic material, such as latex or silicone rubber, is used as the elastic separating layer, the membrane does not adhere to the glass surface. Therefore, the membrane and the molding portion are separated by having a gas medium or a liquid medium flow in between the membrane and the glass surface.

JP 2003-039564 discloses a light molding device in which an elastic body is disposed on a transparent plate in the same manner as in JP 2002-370286. Specifically, the light-curable resin is held on the elastic body and configured such that the material that has been solidified is more easily separated from the elastic layer than the elastic body being separated from the transparent plate.

As described above, for the conventional three-dimensional molding devices in the related art, in order to separate the portion of the resin that is cured by irradiation of light, it is necessary to have a medium flowing between a frame body having an attached membrane and a glass surface. In addition, to form a membrane made of a highly elastic material, special procedures should be carried out. Accordingly, the device is complex and its cost is high.

SUMMARY OF THE INVENTION

The present invention is directed to a three-dimensional molding device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a three-dimensional molding device for producing a three-dimensional molded object comprising a receptacle for retaining a light-curing resin, a light source for irradiating light to cure the light-curing resin retained inside the receptacle, wherein the three-dimensional molded object is produced by curing the light-curing resin, and a flexible three-dimensional molded object holding plate, which adheres to the light-curing resin and holds the three-dimensional molded object when the resin in the receptacle is cured.

In one aspect of the invention, the device further comprises a lens adjusting the light emitted from the light source and a mirror reflecting the light emitted from the lens onto the receptacle.

In another aspect of the invention, the device further comprises support sections formed on edges of the three-dimensional molded object holding plate for supporting the holding plate in the molding device and a drive means moving the three-dimensional molded object up and down via the support sections.

Preferably, the light-curing resin is in a liquid form. Preferably, the receptacle comprises a translucent plate through which the light penetrates and configured to be a bottom of the receptacle, a flexible membrane through which the light penetrates and removably formed on the translucent plate, and a frame body removably formed on an upper surface of the membrane and having a specified height.

In one aspect of the invention, the translucent plate comprises a glass plate. Preferably, the thickness of the glass plate is 2 mm to 6 mm.

In another aspect of the invention, a surface of the membrane is coated such that the cured resin is easily detached from the membrane. Preferably, the membrane comprises a polyethylene terephthalate (PET) film coated with a fluoro-silicone mold-releasing material. More preferably, the thickness of the film is 50 μm to 120 μm.

In yet another aspect of the invention, the frame body comprises a circular rubber. Preferably, the frame body has an inside diameter of 100 mm to 200 mm and a height of 10 mm to 40 mm. Preferably, the frame body comprises a pass-through hole on a side surface for injection of the light-curing resin in a liquid form into the receptacle.

Preferably, the three-dimensional molded object holding plate comprises a plurality of pass-through holes. Preferably, a thickness of the three-dimensional molded object holding plate is 1 mm to 5 mm. Preferably, the three-dimensional molded object holding plate is a plate-shaped body made of polyacetal.

In accordance with another embodiment of the invention, a method for molding a three-dimensional object comprises pouring a light-curing resin in a liquid form into a receptacle of a three-dimensional molding device comprising a flexible membrane and a flexible three-dimensional molded object holding plate, positioning the three-dimensional molded object holding plate above the membrane, irradiating light onto the light-curing resin retained in the receptacle, using a light source of the three-dimensional molding device, curing the light-curing resin according to a shape of the light to mold a three-dimensional object, detaching the cured three-dimensional molded object from the membrane by shifting up the three-dimensional molded object holding plate, and detaching the three-dimensional molded object from the three-dimensional molded object holding plate by bending the three-dimensional molded object holding plate when the production of the three-dimensional molded object is completed, wherein an upper surface of the cured resin is adhered to a lower surface of the three-dimensional molded object holding plate and a lower surface of the cured resin, which becomes a layer of the three-dimensional molded object, is adhered to a surface of the membrane.

Preferably, the three-dimensional molded object holding plate comprises a plurality of pass-through holes and has a plate-shaped body made of polyacetal.

In one aspect of the invention, the three-dimensional molded object is produced in multiple layers by repeating the steps of irradiating, curing, and detaching until production of the three-dimensional molded object is complete.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a three-dimensional molding device for producing a three-dimensional molded object and a method for molding a three-dimensional object using a light-curing resin cured by light irradiation.

A detailed explanation of one example of the preferred embodiments of the three-dimensional molding device in accordance with the present invention will be given below while referring to the attached drawings.

Figure 1:
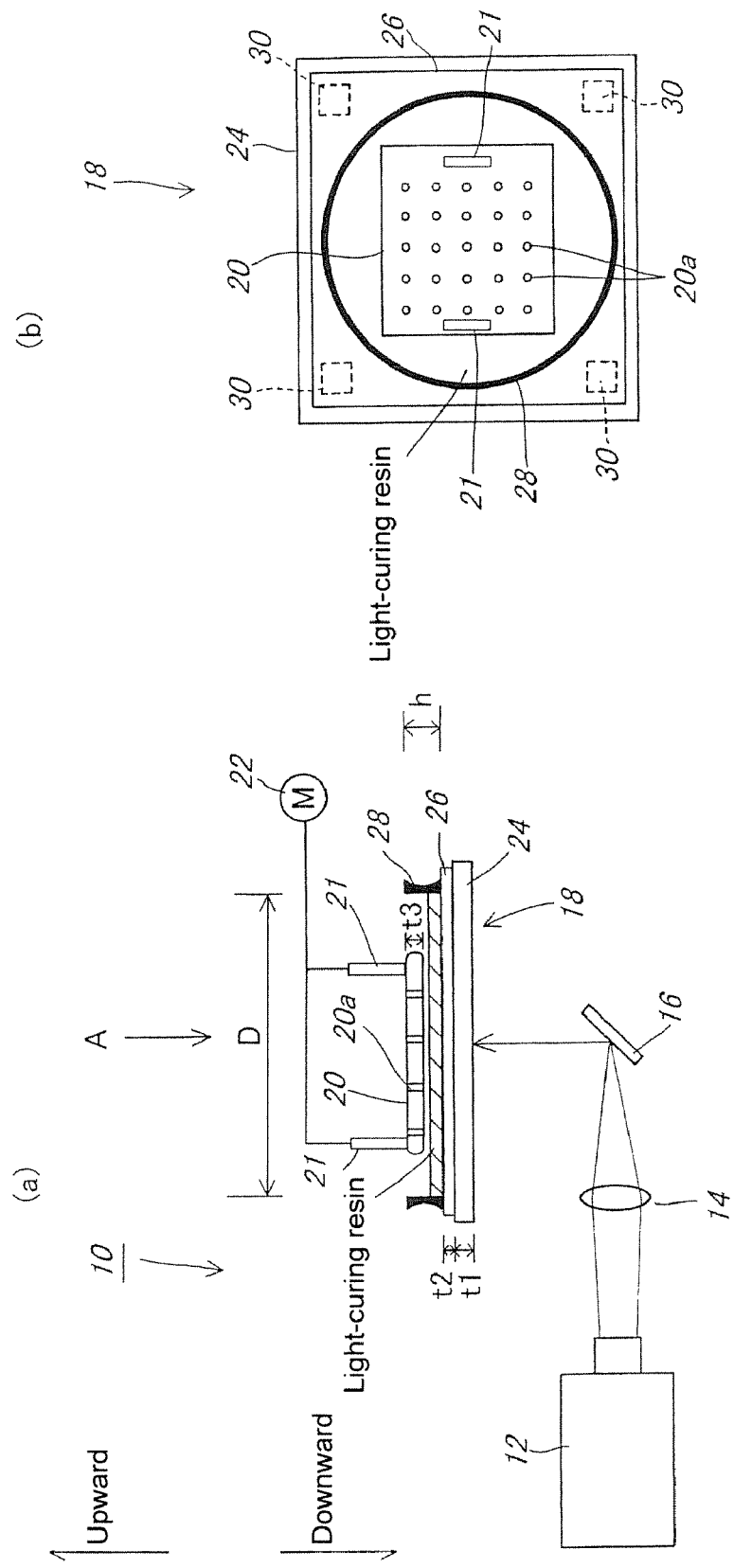
FIG. 1(a) is a cross section drawing of a three-dimensional molding device in accordance with one embodiment of the present invention.
FIG. 1(b) is a structural drawing of the three-dimensional molding device according to a view from the direction of the arrow A shown in FIG. 1(a). In particular, the structure of a receptacle is shown in FIG. 1(b).

As shown in FIGS. 1(a) and 1(b), the three-dimensional molding device 10 in accordance with one example of the preferred embodiments of the present invention has a light source 12 that irradiates light in accordance with data transmitted from a computer (not shown in the drawing), a lens 14 that adjusts the light emitted from the light source 12, a mirror 16 for reflecting the light adjusted by the lens 14, a receptacle 18, which is configured to retain light-curing resin to be irradiated by the light reflected by the mirror 16 inside the receptacle, a three-dimensional molded object holding plate 20 that adheres closely to the light-curing resin cured in the receptacle 18, which becomes a base that holds the three-dimensional molded object, and a drive means 22 that moves the three-dimensional molded object holding plate 20 up and down via support sections 21, which are arranged such that mounting and removal are possible on both the left and right edges of the three-dimensional molded object holding plate 20.

In one aspect of the invention, a projector that projects an image using visible light is employed as the light source 12 and a convex lens is used as the lens 14.

In another aspect of the invention, the receptacle 18 may comprise a translucent plate 24 that becomes the bottom of the receptacle and through which the light from the mirror 16 can penetrate. The receptacle may also comprise a membrane 26, through which the light can penetrate and is arranged on the top surface of the translucent plate 24. The receptacle may further comprise a frame body 28 that has a specified height and is arranged on the membrane 26.

Specifically, for the receptacle 18, the translucent plate 24, through which the light from the mirror 16 penetrates, is configured as the bottom plate, and the membrane 26, through which the light penetrated through the translucent plate 24 penetrates, is arranged on the translucent plate 24 such that attachment and removal are possible since the membrane is attached to a portion of the translucent plate 24 that is outside the frame body 28 by means of double-sided adhesive tape 30, for example. In addition, the frame body 28 has a specified height and makes it possible for the light-curing resin to be retained on the translucent plate 24, thus preventing the light-curing resin from flowing out of the translucent plate 24. Because the frame body 28 is arranged on the upper surface of the membrane 26, attachment and removal of the frame body 28 from the membrane 26 is possible.

Accordingly, it is possible to retain the light-curing resin in a liquid form in the receptacle 18 within the region that is encompassed by the translucent plate 24 and the frame body 28. The liquid form light-curing resin can be supplied from above the frame body 28 to the appropriate region inside the receptacle 18.

Preferably, a glass plate having a thickness t1 of 2 to 6 mm is used as the translucent plate 24. In addition, coating is performed on the surface of the membrane 26, making it possible to easily detach the light-curing resin from the membrane 26. Preferably, a polyethylene terephthalate (PET) film having a thickness t2 of 50 to 120 μm is used for the coating and a fluorosilicone group mold-releasing material is coated on the film surface.

For the frame body 28, a circular rubber material having an inside diameter of 100 to 200 mm and a height of 10 to 40 mm may be used. Preferably, the frame body 28 has a specified weight and will not shift on the membrane 26 even if the frame body is simply placed on a surface of the membrane 26. Moreover, the frame body 28 can be easily mounted on and removed from the membrane 26. In accordance with one embodiment, the frame body is simply placed on the top surface of the membrane 26.

In addition, a pass-through hole is preferably disposed on a side surface of the frame body 28. This allows the light-curing resin to be injected in a liquid form via the pass-through hole.

Also, the three-dimensional molded object holding plate 20 preferably comprises a flexible material having a specified thickness t3. Specifically, the three-dimensional molded object holding plate 20 is made from a thin flexible material and configured to be easily bendable upon the application of force. Preferably, a plate-shaped body made of polyacetal and having a thickness t3 of 1 to 5 mm, more preferably 2 mm, may be used.

As shown in FIG. 1(b), a plurality of pass-through holes 20a may be formed by drilling on the three-dimensional molded object holding plate 20. In addition, various types of mechanisms may be used as the drive means 22. For example, a drive mechanism that employs a stepping motor can be used.

Figure 2:
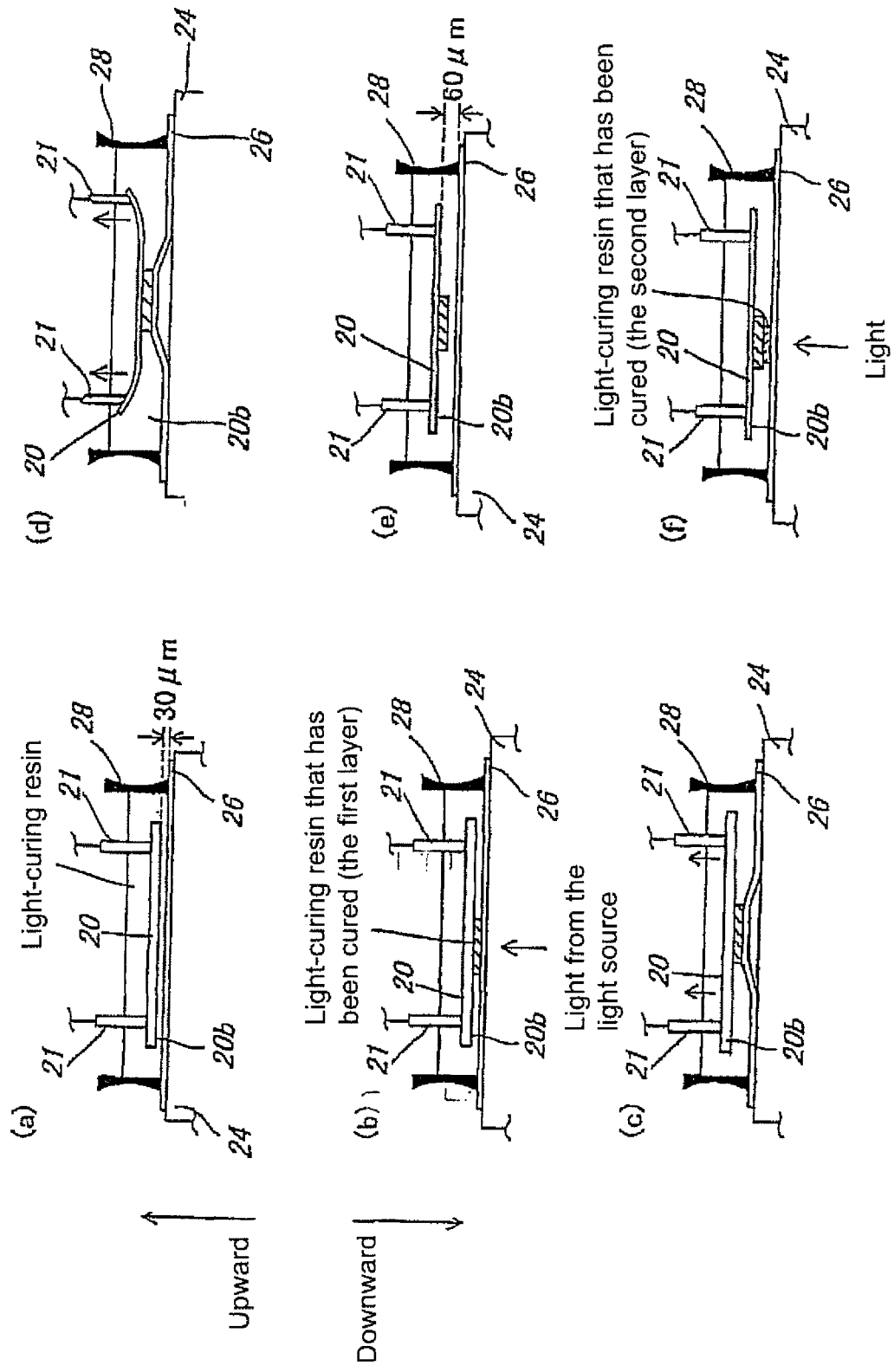
FIGS. 2(a), (b), (c), (d), (e), and (f) illustrate a process of producing a three-dimensional molded object using the three-dimensional molding device in accordance with one embodiment of the present invention.

Referring to FIG. 2, a method for producing a three-dimensional molded object using the three-dimensional molding device 10 will be described below.

A form of the three-dimensional molded object to be produced is displayed using the light emitted from the light source 12. Preferably, data, including the form of the three-dimensional molded object to be produced, are divided by a computer program in a horizontal direction and separated into a plurality of layers. The data is then transmitted from a computer (not shown in the drawing) to the light source 12 one layer at a time, beginning from the first layer, in specific time intervals.

Preferably, the data, including the form of the three-dimensional molded object to be produced, are divided in the horizontal direction into a plurality of layers of 30 μm each. Thus, the data for each layer, having a thickness of 30 μm, are transmitted to the light source 12 in order, beginning from the first layer, one layer at a time in specific time intervals.

In order to produce the three-dimensional molded object, using the three-dimensional molding device 10, the light-curing resin in a liquid form is first poured into and retained inside the receptacle 18 that is encompassed by the translucent plate 24 and the frame body 28. The amount of light-curing resin retained in the receptacle 18 depends on the size of the three-dimensional molded object to be produced. If the amount of light-curing resin decreases during the production of the three-dimensional molded object, additional light-curing resin may be poured into the receptacle.

Referring to FIG. 2(a), the three-dimensional molded object holding plate 20 is shifted by the drive means 22 such that the bottom surface 20b of the three-dimensional molded object holding plate 20 is positioned 30 μm above the membrane 26. Hence, the position of the three-dimensional molded object holding plate 20 is adjusted so that the gap between the surface of the membrane 26 and the bottom surface of the three-dimensional molded object holding plate 20 is 30 μm.

Light is then irradiated from the light source 12 onto the light-curing resin positioned in the gap between the surface of the membrane 26 and the bottom surface 20b of the three-dimensional molded object holding plate 20. The light-curing resin positioned between the surface of the membrane 26 and the bottom surface 20b of the three-dimensional molded object holding plate 20 receives the light and is cured into a desired shape according to the shape of the received light. In this manner, the curing of the first layer of the light-curing resin is completed and the first layer of the three-dimensional molded object is produced as shown in FIG. 2(b).

In order to produce a second layer of the three-dimensional molded object, the three-dimensional molded object holding plate 20 is shifted upward by the drive means 22 and the portion of the light-curing resin that is cured into the first layer of the three-dimensional molded object is shifted upward.

Therefore, the upper surface of the light-curing resin that is cured to be the first layer of the three-dimensional molded object adheres to the lower surface 20b of the three-dimensional molded object holding plate 20. Also, the lower surface of the light-curing resin that is cured to be the first layer of the three-dimensional molded object adheres to the surface of the membrane 26. Referring to FIG. 2(c), when the three-dimensional molded object holding plate 20 is incrementally shifted upward, the light-curing resin adhered to the three-dimensional molded object holding plate 20 also incrementally shifts upward, about 3 to 5 mm.

Still referring to FIG. 2(c), along with the shifting upward of the light-curing resin, the membrane 26 adhered to the light-curing resin is also pulled up and bent. However, because a coating is applied to the surface of the membrane 26, the cured light-curing resin can be easily detached by peeling from the membrane 26.

Referring to FIG. 2(d), when the three-dimensional molded object holding plate 20 is shifted upward, the three-dimensional molded object holding plate 20, which is made from a flexible material, is also bent, imparting elasticity to the light-curing resin. Therefore, when the light-curing resin is detached from the membrane 26, the chance of abrupt detachment is mitigated, and the separation can be done smoothly.

Referring to FIG. 2(e), after the cured light-curing resin is detached from the membrane 26, the membrane 26 is restored to an original flat state. Accordingly, uncured resin is filled into the bottom of the receptacle 18 under the portion of the resin that is cured and raised upward.

To produce the second layer of the three-dimensional molded object, the position of the three-dimensional molded object holding plate 20 is adjusted by the drive means 22 so that the three-dimensional molded object holding plate 20 is positioned at an additional 30 μm above the position at which the first layer was produced. Thus, referring to FIG. 2(e), the position of the three-dimensional molded object holding plate 20 is adjusted so that the gap between the surface of the membrane 26 and the bottom surface 20b of the three-dimensional molded object holding plate 20 is 60 μm.

As in the production of the first layer of the three-dimensional molded object described above, when the light from the light source 12 is illuminated, the light-curing resin positioned between the membrane 26 and the first layer of the cured light-curing resin receives the light and is cured into a desired shape according to the shape of the received light. In this manner, the curing of the second layer of the light-curing resin is completed, and the second layer of the three-dimensional molded object is produced as shown in FIG. 2(f).

Figure 3:
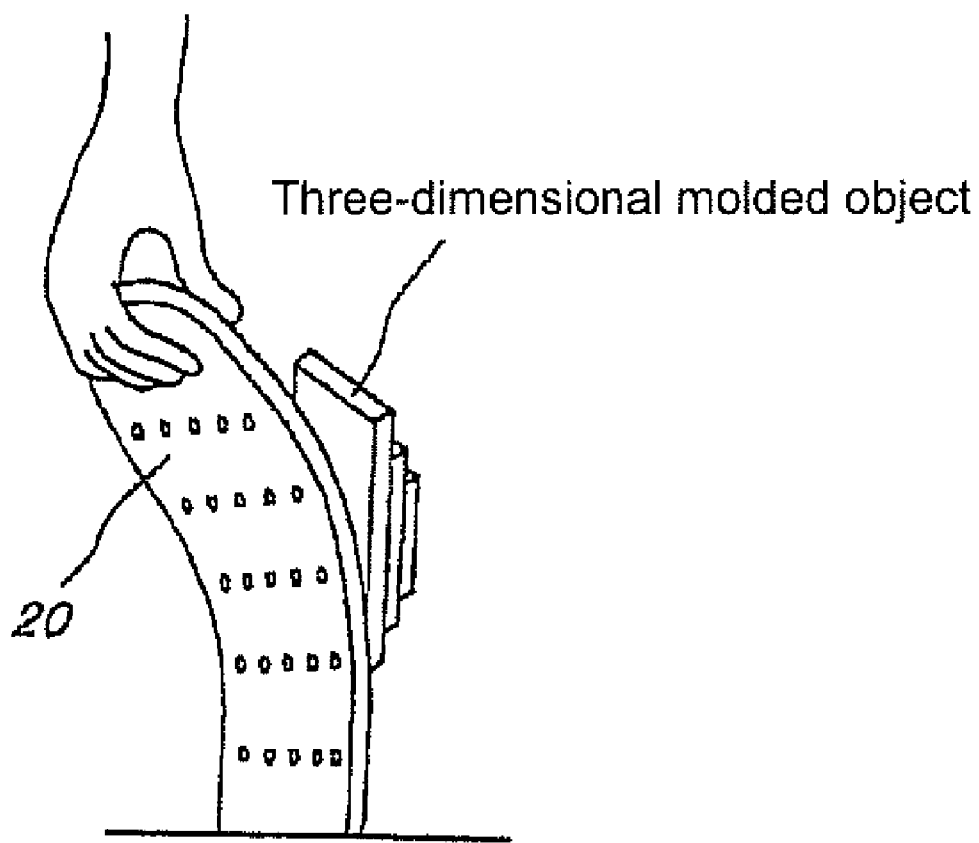
FIG. 3 illustrates a process of detaching the produced three-dimensional molded object from a three-dimensional molded object holding plate of the three-dimensional molding device in accordance with one embodiment of the present invention.

Preferably, the shifting of the three-dimensional molded object holding plate 20 and the light illumination are performed repeatedly in the same manner as in the production of the second layer of the three-dimensional molded object described above until the production of the three-dimensional molded object is complete. When the production of the three-dimensional molded object is completed, the three-dimensional molded object is removed from the three-dimensional molded object holding plate 20. Because the three-dimensional molded object holding plate 20 is made from a flexible material, when a worker applies force to remove the three-dimensional molded object from the three-dimensional molded object holding plate 20, the three-dimensional molded object holding plate 20 easily bends, making it possible to easily detach the three-dimensional molded object as shown in FIG. 3.

As described above, high manufacturing costs can be avoided because the receptacle 18 of the three-dimensional molding device 10 is furnished with a simple configuration.

In addition, because the three-dimensional molding device 10 can be easily disassembled, cleaning and parts repair can be readily performed.

Further, with the three-dimensional molding device 10 of the present invention, the light is illuminated from below the receptacle 18. Thus, because the three-dimensional molded object is produced by curing 30 μm at a time, the minimum amount of light-curing resin required for the molding may be retained in the receptacle 18, therefore avoiding wasted consumption of the light-curing resin.

Furthermore, because a plurality of pass-through holes 20a are formed by drilling the three-dimensional molded object holding plate 20 of the three-dimensional molding device 10, compared to the three-dimensional molded object holding plate in the related art that does not have pass-through holes, air does not mix between the three-dimensional molded object holding plate 20 and the membrane 26 when the three-dimensional molded object holding plate 20 is immersed in the light-curing resin in a liquid state.

Figure 4:
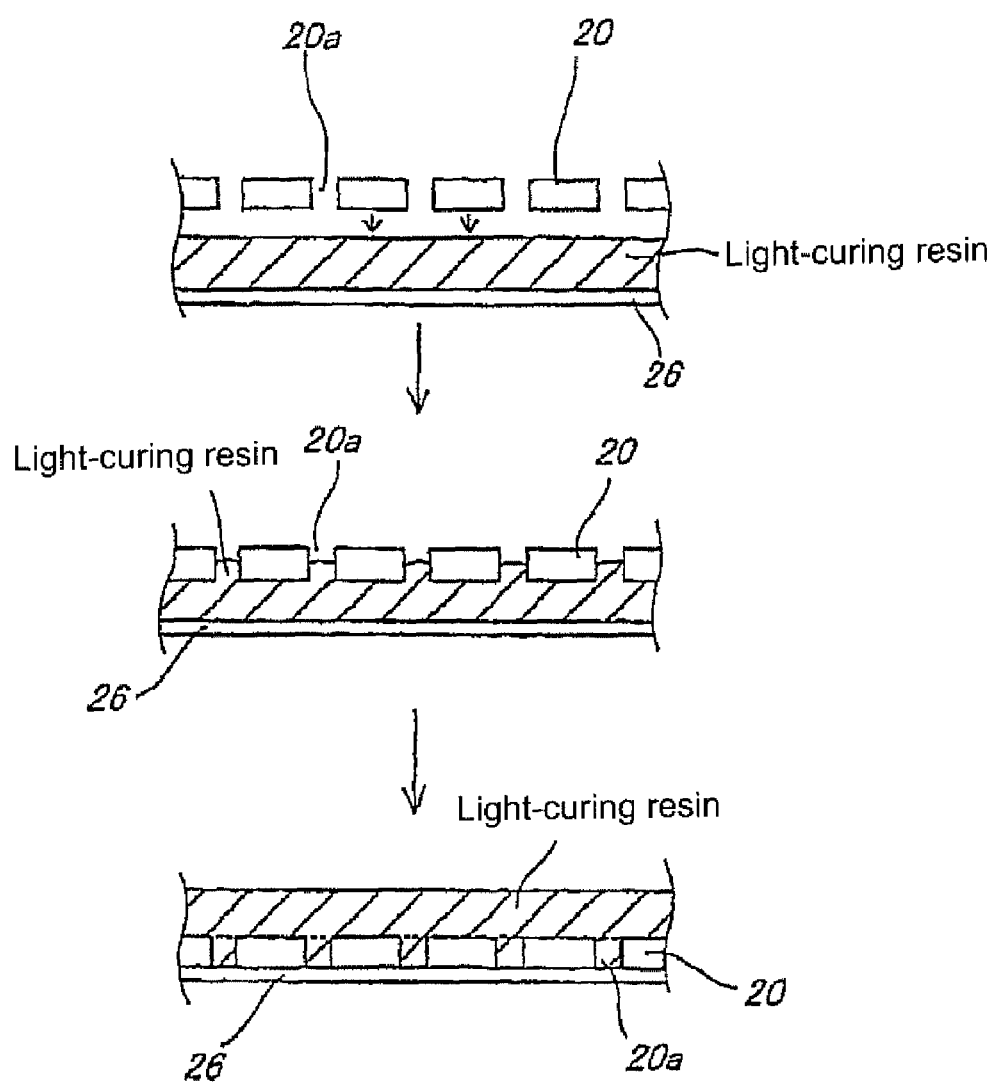
FIG. 4 is illustrates immersion of the three-dimensional molded object holding plate in a liquid form light-curing resin in accordance with one embodiment of the present invention.

Referring to FIG. 4, when pressure is applied onto the light-curing resin in a liquid state by the three-dimensional molded object holding plate 20, the air between the light-curing resin, as well as the three-dimensional molded object holding plate 20, and the membrane 26 passes through the pass-through holes 20a of the three-dimensional molded object holding plate 20. Therefore, it is possible to prevent air from mixing between the three-dimensional molded object holding plate 20 and the membrane 26.

In accordance with the preferred embodiments described above, modifications may be made as shown in (1) through (4) below.

(1) With regard to the material of each structural member, the thickness and inside diameter of each structural member, or the thickness of each layer disclosed in connection with the configuration of the three-dimensional molded object in the preferred embodiment described above, specific material names and numerical values, and the like have been given. However, these respective material names and numerical values do not go beyond being illustrations, and without any doubt, these can be changed or adjusted, depending on the type of light-curing resin and the size of the three-dimensional molded object that is produced.

(2) In the preferred embodiment described above, double-sided adhesive tape 30 was used and the membrane 26 was arranged on the translucent plate 24 such that the membrane could be freely attached and removed. However, the invention is not limited to this particular embodiment, and the membrane 26 may also be arranged on the translucent plate such that the membrane can be freely attached and removed using an adhesive agent, clips or the like.

(3) in the preferred embodiment described above, the frame body 28 has been simply placed on the membrane 26. However, the frame body 28 may also be arranged on the membrane 26 such that the frame body can be freely mounted and removed using a latching device such as a screw.

(4) The preferred embodiment described above and the examples of the modifications that are shown in (1) through (3) described above may be combined as appropriate and necessary.

The present invention may also be utilized for sample trial manufacture in which three-dimensional molded objects are produced in a variety of forms.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A three-dimensional molding device for producing a three-dimensional molded object, the device comprising:
    a receptacle for retaining a light-curing resin;
    a light source for irradiating light to cure the light-curing resin retained inside the receptacle, wherein the three-dimensional molded object is produced by curing the light-curing resin;
    a flexible three-dimensional molded object holding plate comprising a first surface which adheres to the light-curing resin and holds the three-dimensional molded object when the resin in the receptacle is cured;
    support sections formed on peripheral edges of a second surface of the three-dimensional molded object holding plate and supporting the holding plate; and
    a drive means moving the three-dimensional molded object up and down via the support sections,
    wherein the support sections are lifted up when the three-dimensional molded object is formed and adheres to the first surface of the holding plate such that the formed three-dimensional molded object is detached from the receptacle.

2. The device of claim 1, further comprising:
    a lens adjusting the light emitted from the light source; and
    a mirror reflecting the light emitted from the lens onto the receptacle.

3. The device of claim 1, wherein the light-curing resin is in a liquid form.

4. The device of claim 1, wherein the receptacle comprises:
    a translucent plate through which the light penetrates and configured to be a bottom of the receptacle;
    a flexible membrane through which the light penetrates and removably formed on the translucent plate; and
    a frame body removably formed on an upper surface of the membrane and having a specified height.

5. The device of claim 4, wherein the translucent plate comprises a glass plate.

6. The device of claim 5, wherein thickness of the glass plate is 2 mm to 6 mm.

7. The device of claim 4, wherein a surface of the membrane is coated such that the cured resin is easily detached from the membrane.

8. The device of claim 7, wherein the membrane comprises a polyethylene terephthalate (PET) film coated with a fluorosilicone mold-releasing material.

9. The device of claim 8, wherein thickness of the film is 50 μm to 120 μm.

10. The device of claim 4, wherein the frame body comprises a circular rubber.

11. The device of claim 4, wherein the frame body has an inside diameter of 100 mm to 200 mm and a height of 10 mm to 40 mm.

12. The device of claim 4, wherein the frame body comprises a pass-through hole on a side surface for injection of the light-curing resin in a liquid form into the receptacle.

13. The device of claim 1, wherein the three-dimensional molded object holding plate comprises a plurality of pass-through holes.

14. The device of claim 1, wherein a thickness of the three-dimensional molded object holding plate is 1 mm to 5 mm.

15. The device of claim 1, wherein the three-dimensional molded object holding plate has a plate-shaped body made of polyacetal.

16. The device of claim 1, wherein the support sections are lifted up while the peripheral edges of the holding plate are immersed in the light curing resin in a liquid form in the receptacle.

17. The device of claim 1, wherein the support sections are extended vertically from the second surface of the holding plate.

18. A three-dimensional molding device for producing a three-dimensional molded object, the device comprising:
- a receptacle for retaining a light-curing resin
- a light source for irradiating light to cure the light-curing resin retained inside the receptacle, wherein the three-dimensional molded object is produced by curing the light-curing resin;
- a flexible three-dimensional molded object holding plate, which adheres to the light-curing resin and holds the three-dimensional molded object when the resin in the receptacle is cured, the three-dimensional molded object holding plate comprising a plurality of pass-through holes, wherein the holding plate further comprises a first surface that adheres to the light curing resin, and holds the three dimensional molded object when the resin in the receptacle is cured; and
- support sections formed on the peripheral edges of a second surface of the three-dimensional molded object holding plate, wherein the support sections are lifted up when the three-dimensional molded object is formed and adheres to the first surface of the holding plate such that the formed three-dimensional molded object is detached from the receptacle, wherein the receptacle comprises:
- a translucent plate through which the light penetrates and configured to be a bottom of the receptacle;
- a flexible membrane through which the light penetrates and removably formed on the translucent plate; and
- a frame body removable formed on an upper surface of the membrane and having a specified height, the frame body comprising a pass-through hole on a side surface for injection of the light-curing resin in a liquid form into the receptacle, wherein the flexible holding plate and membrane are configured to be bent when the holding plate is shifted upward to detach the cured resin in the receptacle from the membrane.

19. A three-dimensional molding device for producing a three-dimensional molded object, the device comprising:
- a receptacle for retaining a light-curing resin;
- a light source for irradiating light to cure the light-curing resin retained inside the receptacle, wherein the three-dimensional molded object is produced by curing the light-curing resin;
- a flexible three-dimensional molded object holding plate, which adheres to the light-curing resin and holds the three dimensional molded object when the resin in the receptacle is cured, wherein the holding plate further comprises a first surface that adheres to the light curing resin, and holds the three dimensional molded object when the resin in the receptacle is cured;
- support sections formed on the peripheral edges of a second surface of the three-dimensional molded object holding plate, wherein the support sections are lifted up when the three-dimensional molded object is formed and adheres to the first surface of the holding plate such that the formed three-dimensional molded object is detached from the receptacle;
- a translucent plate through which the light penetrates and configured to be a bottom of the receptacle;
- a flexible membrane through which the light penetrates and removable formed on the translucent plate; and
- a frame body having a circular shape, removably formed on an upper surface of the membrane and having a specified height, wherein the flexible holding plate and membrane are configured to be bent when the holding plate is shifted upward to detach the cured resin in the receptacle from the membrane.

* * * * *